United States Patent [19]

Halberschmidt et al.

[11] Patent Number: 4,682,997
[45] Date of Patent: Jul. 28, 1987

[54] PROCESS AND APPARATUS FOR BENDING GLASS PLATES IN A HORIZONTAL POSITION

[75] Inventors: Friedrich Halberschmidt, Herzogenrath; Heinz-Josef Reinmold, Aachen; Norbert Schwarzenberg, Herzogenrath, all of Fed. Rep. of Germany; Herbert Radermacher, Faeren, Belgium; Kurt Blank; Josef Audi, both of Aachen, Fed. Rep. of Germany; Luc Vanaschen, Eupen, Belgium

[73] Assignee: Saint Gobain Vitrage, Courbevoie, France

[21] Appl. No.: 753,501

[22] Filed: Jul. 10, 1985

[30] Foreign Application Priority Data

Jul. 13, 1984 [FR] France ................ 84 11148

[51] Int. Cl.⁴ ............................................. C03B 23/02
[52] U.S. Cl. ........................................ 65/106; 65/104; 65/273; 65/287
[58] Field of Search .................. 65/104, 106, 107, 245, 65/253, 268, 273, 287

[56] References Cited

U.S. PATENT DOCUMENTS 2,223,124 11/1940 Owen ........................................ 49/1
4,204,854 5/1980 McMaster et al. ................... 65/106
4,368,065 1/1983 Frank ................................ 65/273 X
4,386,952 6/1983 Nitschke ............................. 65/268

FOREIGN PATENT DOCUMENTS

A1-5306 11/1979 European Pat. Off. ............. 65/107
A1-106758 4/1984 European Pat. Off. .
A1-107566 5/1984 European Pat. Off. .

Primary Examiner—Arthur Kellogg
Attorney, Agent, or Firm—Pennie & Edmonds

[57] ABSTRACT

Process and apparatus for bending glass plates in horizontal or approximately horizontal position. The invention includes processing the glass plates by means of an installation comprising a glass reheating furnace, a bending station, and a horizontal conveyor for routing the glass plates through the furnace and bending station. A curved surface is placed above the horizontal conveyor in the bending station, and a blower is adapted to deliver a hot air current to bend the glass plates by heating them and applying pressure to urge them against the curved surface to which the desired configuration has been given. Then the glass plates are gently rested on a carrying frame where they continue to be supported, only in part, by said hot air current. The invention makes possible the bending of glass plates individually or, for example, in pairs.

23 Claims, 7 Drawing Figures

PROCESS AND APPARATUS FOR BENDING GLASS PLATES IN A HORIZONTAL POSITION

BACKGROUND OF THE INVENTION

1. Field of the Invention

This invention relates to bending plates of thermoplastic material, in particular glass, as they pass on a conveyor in approximately horizontal position, by raising the plates from the conveyor with heated gas currents and applying them against a bending form placed above.

2. Description of Related Art

It is known from European patent document EP 0 005 306 how to bend a glass plate by lifting it to apply it against a carrying surface by means of a plurality of independent hot air jets directed toward the lower face of the glass plate, the jets being produced by orifices in the form of nozzles in the upper wall of a compressed air vessel, and then dropping the plate from this carrying surface onto a bending mold. The plate bends by the sole effect of its own weight being dropped against the mold. Optionally the plate can also be pressed between the upper carrying surface and the mold.

The carrying surface is, moreover, pierced with orifices through which the glass plate is held by suction at the same time as it is lifted by the air jets exerted against its lower face.

The bending mold may consist of a frame, also called a skeleton, which is intended to bear against the marginal area at the periphery of the glass plate to be bent.

In this known technique, the bending skeleton exerts a mechanical action on the periphery of the glass plate, which, for the bending operation, has been brought to a high temperature in order to be deformable.

In the most favorable case, this action results only from the weight itself of the glass plate but, on the other hand, when the glass plate is forcefully projected in the direction of the skeleton or when it is pressed between the carrying surface and the skeleton, the mechanical action is much greater. This mechanical action on the periphery of the glass plate is harmful; it is characterized by faults in the appearance of the glass surface and by warping that can alter its optical properties.

Such defects in appearance or geometry in the peripheral marginal zone of the glass plates are particularly bothersome when automobile windows are involved. In automobile windows, optical quality is fundamental to safety. Further, modern installation techniques may put the windows directly in contact with the automobile body, without insertion of a gasket and often by simple gluing. Thus the entire surface of the windows, right down to its very edge, can be seen from the outside, which makes a defect in appearance, even in the peripheral marginal zone, intolerable.

Further, when the glass plate is placed or projected against the skeleton, it is not possible to prevent undesirable uncontrolled formation, due to gravity alone of the central zones of the plate, which are not supported by the skeleton.

SUMMARY OF THE INVENTION

Accordingly, one object of the invention is to provide a process for bending glass plates which does not have the above-mentioned defects of the prior art, i.e., which makes it possible to produce bent glass plates having a well controlled profile, without undesirable deformations, which are free at the same time of defects and alterations produced by the mechanical action of the bending skeleton.

The invention also aims at a device suitable for practicing the process.

For this purpose, the invention proposes a process for bending glass plates in which the glass plates are applied against a bending form placed above them by the effect of gas blown under the plates. Then the bent plates are placed on a carrying device, and the flow and pressure of the gas blown under the glass plates are reduced to a level that is still sufficient for a large fraction of the weight of the glass plates to be balanced by the pressure of the gas.

In this process according to the invention, the lower carrying device no longer acts as a bending form as in the prior art but only as a means of transport of the bent plates to route them to the next work station, which as a rule is the annealing or tempering station.

Bending of a glass plate to its final configuration is done exclusively by the pressure of the gas which applies said glass plate, over its entire surface, against the upper bending form, whose geometry and profile correspond to those of the desired bent plate. The dimensions of the upper bending form are preferably slightly smaller than those of the plate. Consequently, during bending, no tool exerts the slightest mechanical pressure on the glass plate. Even when the bent glass plate is placed back on the carrying device, the latter does not exert any harmful force on the glass, since the glass remains partly supported by the gas and the force exerted on the carrying device is not sufficient to mark or deform the glass in any way whatsoever.

Even at the moment of placement, the glass plate is placed slowly and gently on the carrying device; and after placement a large fraction of the weight of the glass, on the order of about 80 percent, is balanced by the gas current.

For this reason, uncontrolled and undesirable overbending in the parts of the glass located between the areas of support on the carrying device does not occur because of the substantial supporting of the weight of the glass by the air.

Because of this greatly reduced effect of the weight of the glass, it is even possible to use as the carrying device only a simple carrying device consisting, for example, of three carrying pins, which is adaptable to glass plates of various profiles and configurations, rather than a carrying frame suited to the profile of the glass.

Moreover, since according to the invention the bending is performed exclusively by the gas current, which is heated, the adjustment of the temperature is not as essential a parameter as in the mechanical bending processes of the prior art. This is a particularly important advantage for the production of safety windows which are tempered after bending by sudden cooling.

Not only can be process according to the invention be used for bending glass plates taken individually, but it is also quite particularly suited for simultaneous bending of several glass plates placed above one another, which are, for example, then assembled with interlayers to constitute a composite window. In contrast with standard prior processes for simultaneous bending of several glass plates placed on one another, the process according to the invention makes it possible for the first time to avoid undesirable deflections even during bending of pairs of glass plates. Further, in this way it is possible to bend even pairs of glass plates of complicated configuration, which could not be obtained up to now with standard processes.

In this process according to the invention, the effective pressure of the hot gas applied under the glass plates alternately goes from a high value on the order of 100 to 400 mm of a water gage (WG) to a lower value on the order of about 5 to 30 mm (WG), these ranges being essentially a function of the thickness of the glass plates and their number.

Advantageously, the gas current applied under the glass plates is such that it has a uniform flow field, without local pressure peaks, and is also such that it has practically no static pressure components which would lead to pressure gradients below the glass.

Optionally, for example, in the case of considerable deflections for greatly bent windows, it is also possible to create a gas current with a nonuniform flow field, i.e., with an essentially dynamic pressure profile which exhibits a higher value below the marginal zones to be greatly curved.

Advantageously, before bending, at the beginning of the bending station or even in the last section of the reheating furnace, it is possible to provide for directing a hot carrying gas current toward the lower face of the glass plates, this current balancing a fraction of the weight of the glass plates. Thus, it is possible to avoid possible deformations that could appear during transport of the glass plates on conveyor rollers. This accessory measure also contributes to obtaining bent glass plates of good quality.

BRIEF DESCRIPTION OF THE DRAWINGS

The invention will now be described in more detail with reference to the accompanying drawings, in which.

DETAILED DESCRIPTION OF PREFERRED EMBODIMENTS

Figure 1:
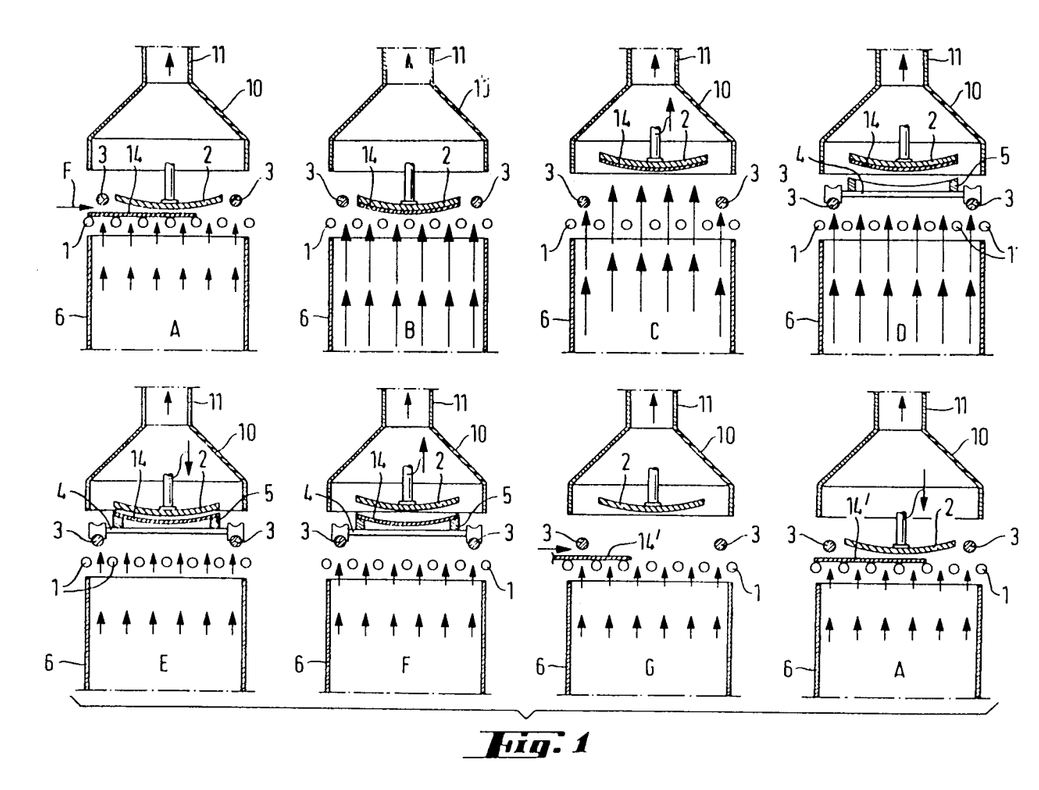
FIG. 1 is a series of cross-sectional elevational views illustrating a bending process according to an embodiment of the invention.

FIG. 1 is a cross-sectional elevation of a bending station showing the succession of the various steps of a bending process according to the invention.

As seen therein, the bending station comprises a horizontal roller conveyor 1, a bending form 2, which is placed in the center of the bending station and above roller conveyor 1 and mounted on supports to allow it to ascend and descend, rails 3 on both sides of bending form 2, on which can move a cartridge 4, equipped with a conveyor device having the shape of a carrying frame 5, a gas flow duct 6 below roller conveyor 1 in which the hot gas current, such as an air current, is directed vertically upward between the rollers of roller conveyor 1, and a hood 10 closing the top of the bending station to capture the hot gas, connected to a tubular duct 11 which allows recycling of this hot gas in duct 6.

The elements for production of the hot gas current, for example air, which are described more in detail below, should make it possible to create a homogeneous air current with a uniform pressure profile, without pressure peaks, or with a pressure profile comprising an increased pressure only in selected locations.

Glass plate 14, heated to bending temperature, is sent by motor-driven conveyor rollers 1, in the direction of arrow F, from a reheating furnace, not shown, to the bending station.

This situation, in which the glass plate still has not reached its final position in the bending station, is shown in view A of FIG. 1. At this moment in the process, bending form 2 is in a low position, i.e., only a slight distance above glass plate 14. There is directed from below, toward glass plate 14, a hot air current at a temperature of about 650° C. and with such a flow rate that, in the case of a glass plate 4 mm thick, there prevails immediately below said plate 14, a supporting pressure, i.e., a dynamic pressure of about 10 mm WG. With this gas current, the weight of glass plate 14 is compensated to the extent that the glass plate is not deformed by sagging between conveyor rollers 1, so that, on the other hand, the fraction of the weight supported by conveyor rollers 1 suffices for transporting the plate. The flow and pressure of this hot air current are adjusted as a function of the thickness of glass plate 14.

As soon as glass plate 14 has reached the bending station and has arrived under bending form 2, the flow and, consequently, the pressure of the hot gas current are rapidly increased to a value that suffices to separate glass plate 14 from conveyor rollers 1 and to apply it entirely against the surface of bending form 2. This situation is shown in view B of FIG. 1.

As shown in FIG. 1, a bending form 2 was chosen that has exactly the dimensions of window 14. However, it is preferable to use bending forms 2 having slightly smaller dimensions, for example 2-10 mm smaller than the window 14 around the entire circumference of the form.

As soon as glass plate 14 is applied against bending form 2, the latter is brought to its highest position (view C, FIG. 1). During this time, the rising gas current remains unchanged so that glass plate 14 remains pressed against form 2 during this upward movement. Immediately (view D, FIG. 1) carriage 4 equipped with carrying frame 5 is brought below bending form 2 and positioned below glass plate 14 by sliding on rails 3.

Then (view E, FIG. 1), while the high pressure of the gas is maintained, bending form 2 is brought down until glass plate 14 is a very slight distance above carrying frame 5, for example, a few millimeters. As soon as this position is reached, the pressure of the gas current is reduced to the low value of about 10 mm WG. Thereby, glass plate 14 is slowly and gently placed on carrying frame 5. In this situation (view F, FIG. 1), the slight gas pressure, of about 10 mm WG, is maintained; it prevents an undesirable sagging of the glass plate inside carrying frame 5. Bending form 2 is then brought back to its highest position.

When bending form 2 has reached its highest position, carriage 4, with glass plate 14, now bent, carried by carrying frame 5, is brought, on rails 3, to the outside of the bending station. The bending station is thus freed for the process of bending the following glass plate 14', which during this time enters into the bending station, on conveyor rollers 1 (view G, FIG. 1). While glass plate 14' is arriving at its bending position, bending form 2 has descended to its lowest position, in which its bending surface is just above glass plate 14'. Just as in the process steps shown in views F and G, the gas pressure at this moment is kept at its low value, to avoid undesirable deformations of glass plate 14' particularly by sagging between conveyor rollers 1. Again the beginning of the bending cycle, as shown by view A of FIG. 1, has been reached.

The bending process according to the invention is perfectly suited to production of windows for automobiles, these windows optionally being tempered after bending.

Figure 2:
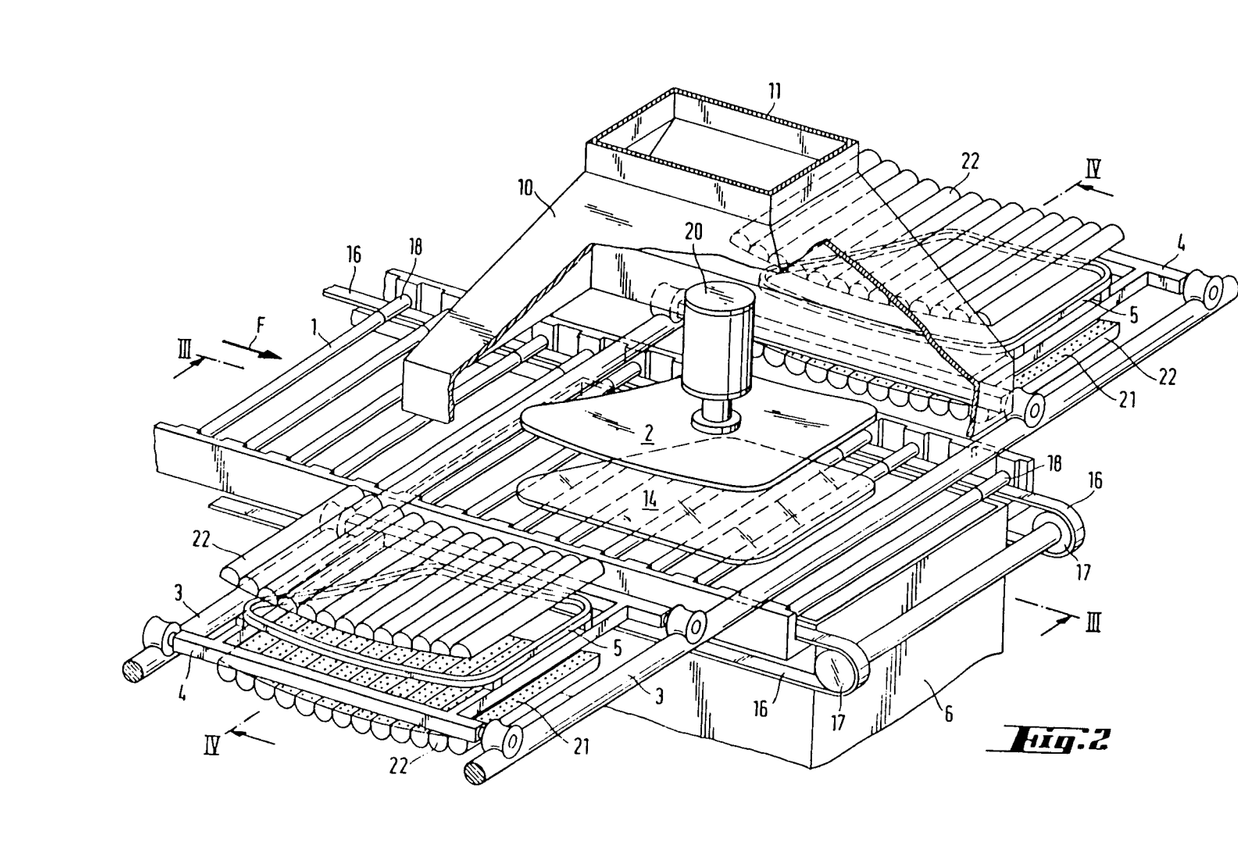
FIG. 2 shows a device adapted for bending a glass plate according to the process of the invention, and then for tempering the glass plate.

An installation for bending and tempering of glass plates is described in detail in connection with FIGS. 2, 3 and 4.

Conveyor rollers 1 constitute a horizontal conveyor device inside a continuous feed reheating furnace of the channel type which, however, has not been shown as such for reasons of better legibility. Driving of these conveyor rollers 1 is done by friction coupling, with a flexible endless metal belt 16 driven and put under tension on pulleys 17. Ends 18 of conveyor rollers 1 rest, free to rotate, on this metal belt.

At the bending station, which comes after the reheating furnace, above the transport plane for glass plates 14, bending form 2 with a solid surface has freedom of movement in the vertical direction and is brought to different positions by adjustable jack 20. Crosswise to transport direction F, in which glass plates 14 go into the bending station, there are placed in said bending station, on both sides of bending form 2, rails 3 on which slide two carriages 4, each of which carries a carrying frame 5. These carriages each travel in turn into the bending station where each time they pick up a glass plate 14, which is already bent, and then go into one of the two tempering stations, placed on the sides of the bending station; stations in which the glass plates are tempered. In each of the two tempering stations, below and above carriage 4, are installed blowing devices 22, consisting, for example, of tubes pierced with blowing orifices 21, by which glass plates 14 are subjected in a conventional way to a sudden cooling.

In the bending station, below conveyor rollers 1, is placed a flow duct 6 of rectangular section through which the hot air current with a homogeneous flow field is directed vertically upwards. The gas current flows around bending form 2, is collected by roof-shaped hood 10 and is recirculated to duct 6 by tubular duct 11.

Figure 3:
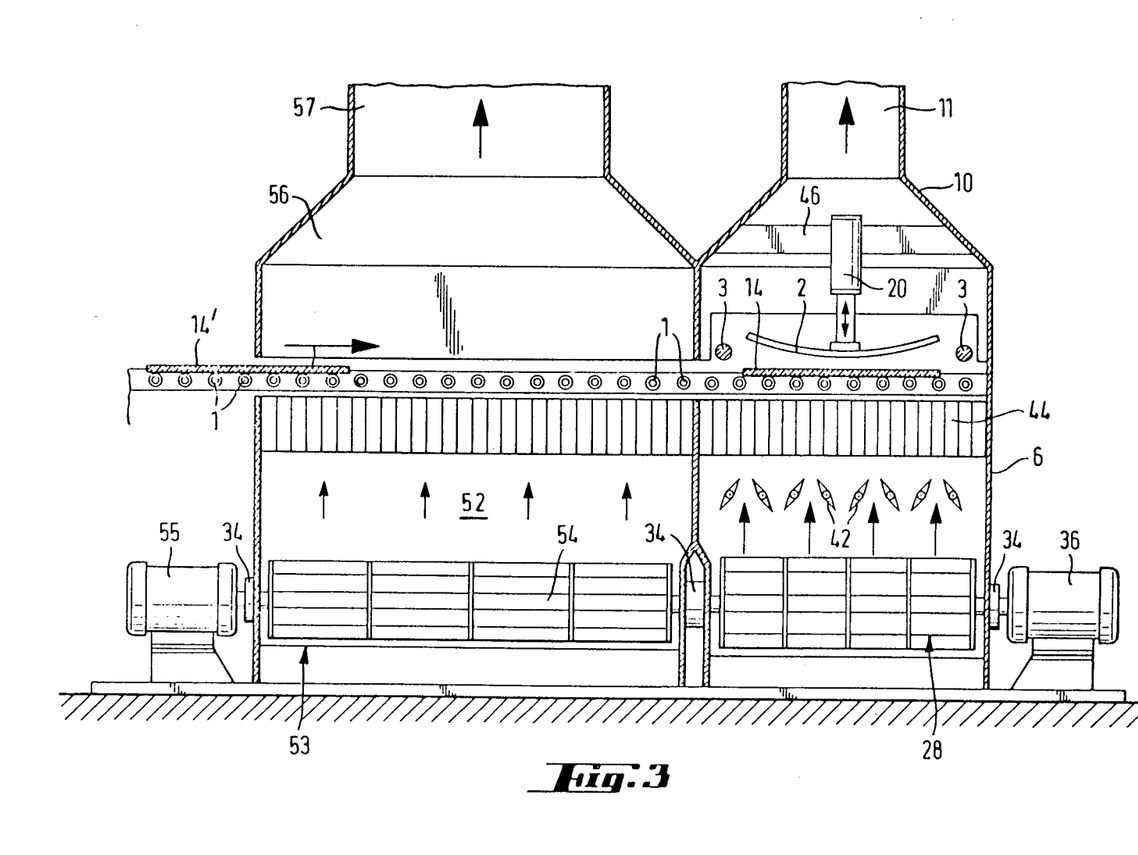
FIG. 3 is a cross-sectional view of the device of FIG. 2 taken along line III—III.
Figure 4:
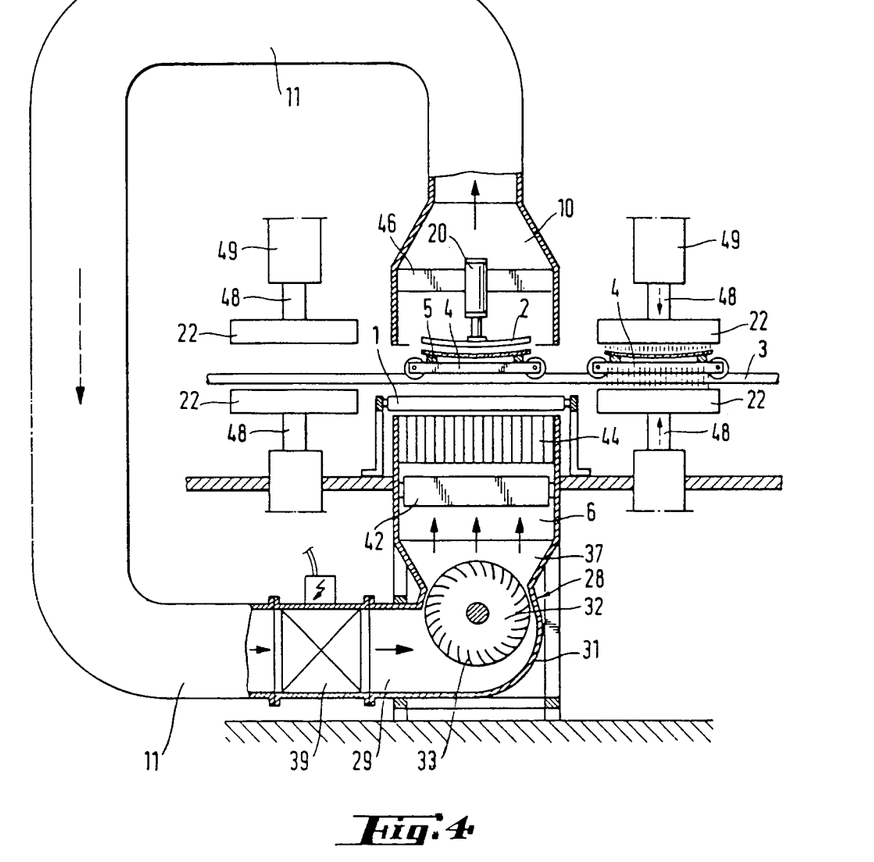
FIG. 4 is a cross-sectional view of the device of FIG. 2 taken along line IV—IV.

The devices intended to create and regulate the gas current are shown in detail in FIGS. 3 and 4. Since to separate glass plate 14 from conveyor rollers 1 it is necessary to create a hot gas current exerting on glass plate 14 a dynamic pressure on the order of 100 to 250 mm WG uniformly over its entire surface, it is necessary to achieve with suitable blowers a large flow with the necessary pressure. The gas current, for example air, should in addition have on the inside of the enclosure a temperature on the order of about 650° C. It is also necessary that the gas current, on the inside of the bending enclosure, be as uniform as possible, i.e., without disturbing turbulences which could have a harmful effect on the bending process.

Also, the devices provided for creation of the hot gas current should permit a fast adjustment of the pressure and flow to be able to go from a low pressure to a high pressure and vice versa.

To create the necessary homogeneous hot air current, it is recommended to use, for example, a device as described in the European patent document published under No. 0 106 758. In this previously described device, the hot gas (current created by a radial-flow blower, is sent into an enclosure whose upper closing wall has a great number of gas outlet orifices of determined size and also according to a determined arrangement; the distance between the closing wall provided with gas outlet orifices and the glass plate being such that the gas jets meet and overlap to form a homogeneous flow field, at the level of the glass plate. Further, the evacuation surface for the gas, delimited by the edges of the glass plate and the closing wall, is at least as large, and preferably larger, than the sum of the sections of the gas outlet orifices in the closing wall of the enclosure, over a surface equal to that of the glass plate.

It is also possible to use cross-flow blowers, which are particularly advantageous in the application envisaged. These blowers not only have ducts having rectangular cross-sections, particularly well suited to our problem, and favorable flow conditions, but they can be used at relatively high temperatures because the turbine-carrying bearings are placed on the outside of the hot gas current. Further, with such cross-flow blowers, the possibilities of regulation are better and the size is reduced.

Therefore, in the embodiments of FIGS. 3 and 4, a cross-flow blower 28 has been provided to create the hot air current. A supply duct 29 of blower 28, of rectangular cross-section, is connected to tubular duct 11, coming from evacuation hood 10 above the bending station. A turbine 32, with vanes 33, turns in a housing 31, while its bearings 34 are on the outside of housing 31. Driving of turbine 32 is performed by a motor 36. Outlet duct 37 having approximately the necessary cross-section of the hot air current in the bending zone, is located above blower 28, below the bending zone, and comes out in flow duct 6, by which the gas current is directed toward the glass plates.

Between supply duct 29 and tubular duct 11 is placed a duct section 39, in which electric heating devices are installed to heat the air current to the necessary temperature, of about 650° C.

In flow duct 6 are placed mobile flaps 42, by which the flow can be increased or reduced. Above these flaps 42 are placed vertical deflectors 44, which serve to make the gas flow regular.

FIGS. 3 and 4, in addition, show conveyor rollers 1, rails 3 on which carriage 4 can move with carrying frame 5, and bending form 2, which is movably mounted in the vertical direction with a jack 20 or an equivalent mechanical lifting system. Jack 20 is mounted, with braces 46, on the inside of evacuation hood 10. On both sides of the bending station can again be found the tempering station which comprises blowing devices 22, installed above and below the plane of transport for the already bent glass plates.

Blowing devices 22 are connected, by means of suitable hoses 48, to boxes 49 supplied with tempering air or gas, preferably at ambient temperature.

FIG. 3 also shows the last section 52 of the furnace for reheating of the glass plates before they enter the bending station. In this last section, the glass plates have already reached the temperature necessary for bending; there is the danger then that they will be deformed, under the effect of their own weight, during transport on conveyor rollers 1. To rule out this risk, in the reheating furnace itself, particularly in its last section, a hot gas current is directed upward to support by this means a part of the weight of the glass plates and partially to lighten the load on the conveyor rollers. As in the bending station, there is also provided here, below roller conveyor 1, a flow duct in which a hot gas current is introduced, by a transverse blower 53 whose turbine 54 is driven by a motor 55. This current with homogeneous flow is directed toward the glass plates.

Above roller conveyor 1, the gas current is collected by an evacuation hood 56, and is recycled by a tubular duct 57. On the inside of the tubular duct recycling the hot gas, and preferably immediately before the suction orifices of the cross-flow blower 53, is placed a heating unit, not shown in the figure, by which the gas is heated to the necessary temperature, around 650° C. The flow and pressure of the gas, created by cross-flow blower 53, are determined and adjusted as a function of the thickness of the glass plates for which there prevails, below said glass plates, a dynamic pressure between about 5 and 30 mm WG. Thus only about 10 to 20 percent of the weight of the glass plates is supported by conveyor rollers 1.

Figure 5:
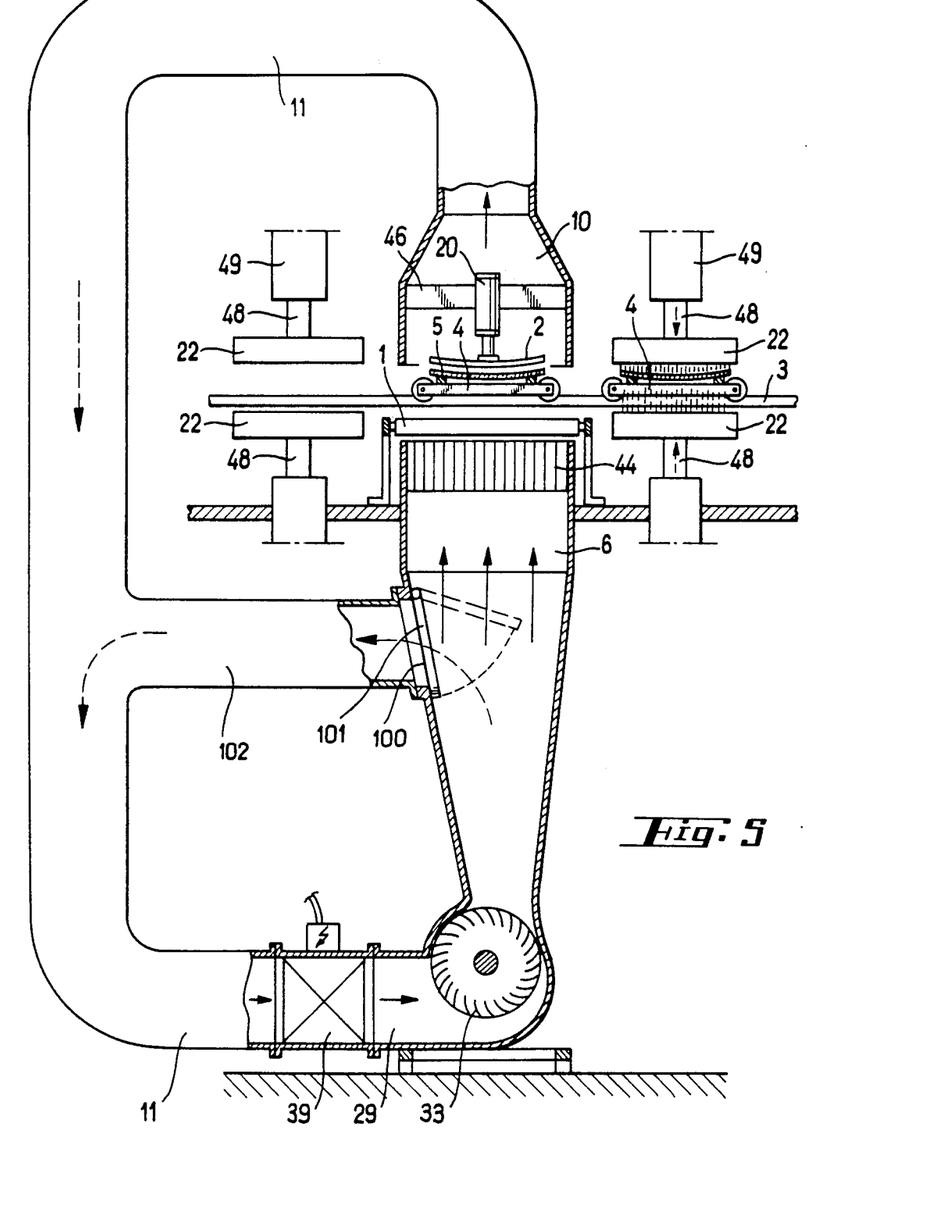
FIG. 5 shows an alternate embodiment of apparatus according to the invention, provided with a by-pass.

According to an alternate embodiment shown in FIG. 5, an opening 100 is provided in the lateral wall of duct 37, which can be opened and closed at will by a movable flap 101, thus permitting either the entire air current (to provide maximum blowing pressure), or only part of the air current (to provide a reduced pressure), to be directed into the outlet duct. The part of the air current withdrawn by opening 100 is advantageously returned to the tubular duct 11 by way of a duct 102. This by-pass system provides a simple way of varying the pressure and quantity of the air current directed under the glass plates.

Figure 6:
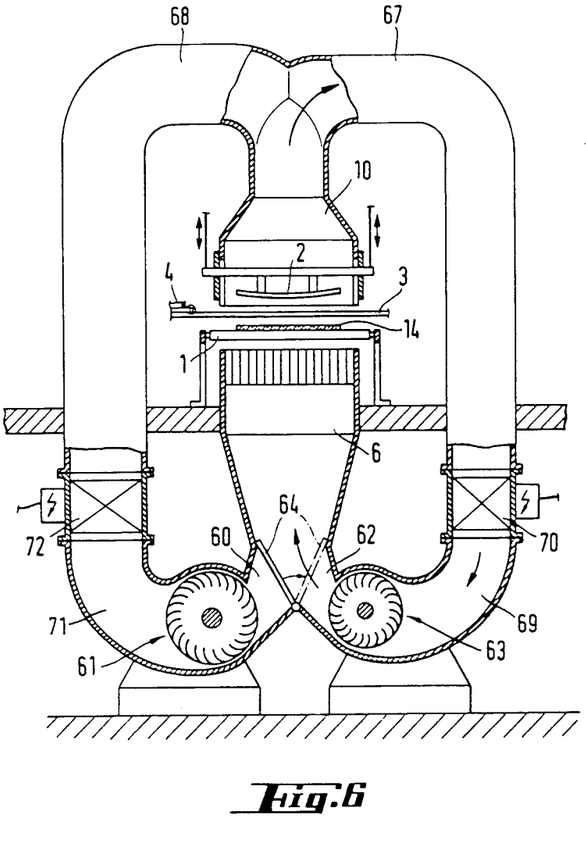
FIG. 6 shows another alternate embodiment of a bending device according to the invention with two separate blowers to create a varying pressure field under the glass.

In the embodiment shown in FIG. 6, relating to another alternate installation appropriate for practicing the process according to the invention, passage from high flow to slight flow of the gas current and vice versa is performed in a particularly efficient and effective way with two cross-flow blowers 61 and 63 of different power, which serve alternately to create the necessary carrying gas current. For this purpose, the flow duct 6 are connected output duct 60 of one of the cross-flow blowers, the one, for example, referenced 61, of a relatively high power, and also output duct 62 of the other cross-flow blower, for example 63, of a relatively low power. The two output ducts 60 and 62 are arranged in relation to one another so that with a flap 64, it will be possible, at will, to open one of the output ducts 60 or 62 and then at the same time close the other of the output ducts 62 or 60. The blowers 63 and 61 are fed respectively by tubular ducts 67 and 68, which are provided with heating units 70 and 72, by which the gas current is heated to the necessary temperature of about 650° C. This gas thus heated is routed to blower 61, or 63, by duct 71, or 69. The two blowers 61, 63, each rotate at a speed that corresponds to the high and low flows and pressures, which are necessary for the various stages of the process.

To apply glass plate 14 to bending form 2 and keep it there, flap 64 is put in the position that allows supplying of gas with the strongest flow and strongest pressure, and also its recycling. On the other hand, to assure the slow placement of glass plate 14 on carriage 4 after bending, flap 64 is put in the other position allowing the supplying and recycling of the gas with the slightest flows and pressures.

In FIG. 6, blower 61 is the one considered to have the strongest flow; consequently, to apply glass plate 14 to bending form 2, flap 64 takes the position shown by dotted lines.

Figure 7:
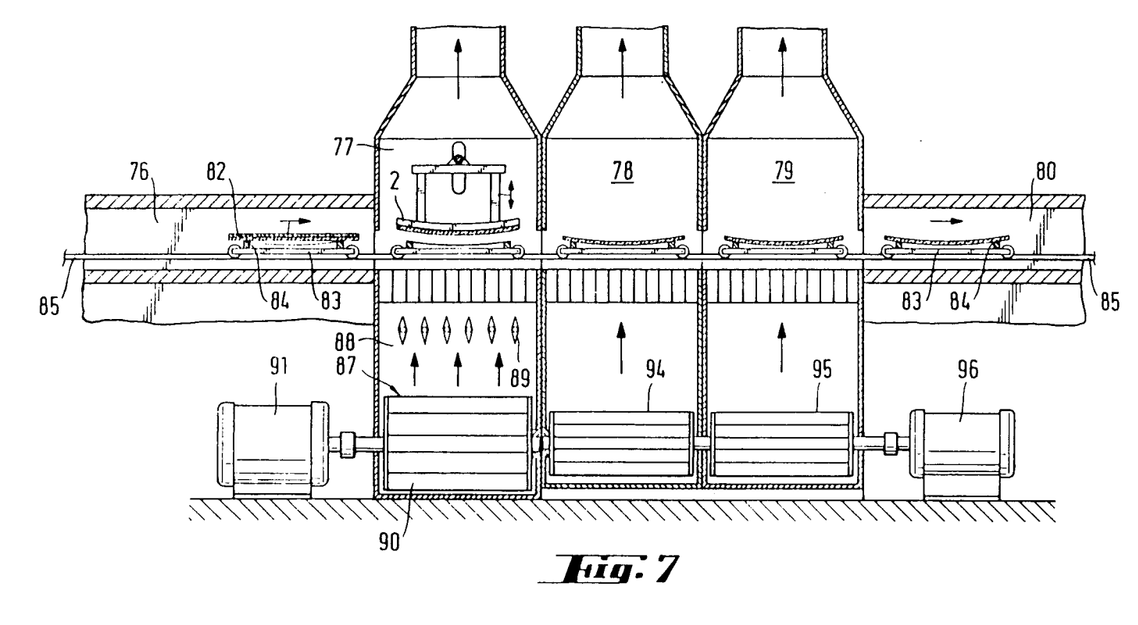
FIG. 7 shows a bending furnace according to an embodiment of the invention in vertical longitudinal section, adapted for bending of glass plates in pairs.

Since the process according to the invention, suited to production of bent windows, tempered or not, is also particularly well suited to production of composite windows comprising two or more associated bent glass plates, tempered or not, we describe by way of example in relation to FIG. 7, an installation for simultaneous bending of a pair of glass plates.

This bending installation comprises a furnace for reheating the glass plates to their bending temperature, a bending station 77, in which the glass plates are bent to the desired configuration, two cooling stations 78 and 79, for slow cooling by stages of the glass plates, and a cooling enclosure 80, in which the glass plates are finally cooled in an accelerated manner to the usual temperature for further treatment. Glass plate pairs 82 carried by frames 84 placed on mobile carriages 83 are sent at a determined rate on rails 85 through the installation.

Below bending station 77 is placed a cross-flow blower 87, creating a gas current that is directed by a flow duct 88 to the glass plates carried by carriage 83. By adjusting the flaps 89 or by regulating the running of turbine 90 of blower 87 by an ad hoc control of its motor 91, the flow rate of the gas in flow duct 88 can be brought to a high value, by which glass plate pair 82 is pressed against bending form 2. By further reducing the flow rate, the pair of plates 82 after bending is again brought down and slowly placed on transport frame 84.

Carriages 83 are then sent into the two cooling stations 78 and 79, in which a carrying gas current is also maintained. To create the carrying gas current in these two cooling stations 78, 79, again two cross-flow blowers 94, 95 are used, which are driven by a common drive motor 96. With these cross-flow blowers 94, 95, there is created, in each of the two cooling stations, a gas current whose flow rate is adjusted so that about 80 and 90 percent of the weight of glass plates 82 is supported by the gas current. In this way, the already bent glass plates are kept from sagging in their central zone that is not supported by frame 84, under the effect of their own weight.

While the gas current in bending station 77 has a high temperature of about 650° C., the temperature of the gas current in cooling stations 78 and 79 is gradually reduced, for example, to 600° C. in enclosure 78 and to 550° C. in enclosure 79. Below this temperature of about 550° C., no deformation of the glass plates appears any longer so that continuation of the support of the glass plates by the gas is no longer necessary. The glass plates can continue to be cooled in a standard cooling enclosure 80.

By this installation, glass plates of various dimensions can be bent.

To reduce consumption of hot gas, when it is desired to bend small-sized glass plates, one or more horizontally placed diaphragms can be provided in the flow duct below the transport device.

The above description has been made with reference to the treatment of glass plates, but plates of another thermoplastic material, for example polycarbonate, can also, of course, be treated, the pressures and temperatures indicated above being, of course, adapted as a function of the material.

In the same way, the transport devices were described as being horizontal, but a slight variation in regard to this orientation would not modify the invention.

Other variations and modifications that may occur to one skilled in the art within the spirit and scope of the invention are also considered to be part of the invention, as defined in the claims.

We claim:

1. A process for bending plates of a thermoplastic material such as glass or the like into a desired shape in a substantially horizontal position, wherein a substantially horizontal conveyor carries the plates from a reheating furnace into a bending station where the plates are lifted by a hot upward gas current and applied against an upper surface above the conveyor, and then lowered onto a carrier below the upper surface which carries the plates to a cooling station, comprising the steps of
    curving the upper surface to have the configuration into which the plates are to be bent,
    adjusting volume of flow and pressure of the hot upward gas current to a high level to apply plates against the upper surface so as to bend them, and after said bending, reducing the flow and pressure of the gas current to a lower level to lower the plates and place them on the carrier, said gas current still supporting a substantial part of the weight of the plates while the plates are on the carrier.

2. The process according to claim 1, wherein the volume of flow and pressure of the hot gas current are adjusted so that the pressure acting on the plates from below after the bending operation is of the proportion of 0.02 to 0.3 of the pressure during the bending operation.

3. The process according to claim 1, wherein the hot gas current has a uniform flow profile, without pressure peaks or disturbing turbulences.

4. The process according to claim 1, wherein the hot gas current has a flow profile with a higher pressure against the marginal zones of the plates, but without pressure peaks or disturbing turbulences.

5. The process according to claim 1, wherein the hot gas current is recirculated in a closed circuit.

6. The process according to claim 3, wherein the plates are bent with a hot gas current whose cross-section corresponds substantially to the surface of the plates to be bent.

7. The process according to claim 1, wherein two blowers are employed to create hot gas currents with alternately high and low flow and pressure, a first blower being used to deliver a gas current under slight pressure and a second blower delivering a gas current under high pressure, the two blowers being driven simultaneously and their gas currents being alternately directed toward the plates by an adjustment flap.

8. The process according to claim 1, wherein the plates are carried on a conveyor having the form of rollers from the reheating furnace to the bending station and, after bending, are placed on a carrier which is introduced into the bending station after the bending operation itself.

9. The process according to claim 1, wherein the plates are carried on a conveyor having the form of an annular carrying device from the reheating furnace to the bending station and, after bending, are again placed on this annular carrying device.

10. The process according to claim 1, wherein the plates, in the reheating furnace, before arrival in the bending station, are supported in substantial part by a hot gas current directed upward to avoid any deformations caused by their own weight.

11. Apparatus for bending a plate of a thermoplastic material such as glass or the like in a one step operation into a final shape while in a substantially horizontal position, comprising
    a bending station,
    conveyor means in substantially horizontal disposition extending into the bending station, said conveyor means adapted to support said plate for movement to said bending station,
    carriage means movable into said bending station for receiving said plate after it is bent to said final shape, and movable out of said bending station with said plate,
    a bending surface mounted in the bending station above and facing the conveyor means, said surface having a curvature to determine the final shape of the plate to be bent,
    means for moving said bending surface in opposite directions toward and away from said conveyor means,
    blower means comprising at least a first cross flow blower mounted in the bending station below the conveyor means and plate in the bending station for delivering an upward gas current to lift the plate from said conveyor means and apply it against said surface, said blower means providing sufficient gas lifting pressure in application of said plate against said surface whereby the upward gas current acts against the plate to bend the plate to the desired, final shape, and
    evacuation means in said bending station above the conveyor means for receiving and evacuating gases blown from said blower means from said bending station.

12. The apparatus according to claim 11, wherein said evacuation means comprises
    an evacuation hood,
    a tubular duct communicating with the evacuation hood, and
    a supply duct interconnecting the tubular duct and the blower means,
    said evacuation hood, said tubular duct, and said supply duct constituting a closed circuit system.

13. Apparatus according to claim 11, wherein said blower means includes
    first and second cross-flow blowers for respectively delivering high and low pressure gas currents,
    first and second flow ducts for receiving said gas currents from said two blowers,
    a common flow duct interconnecting said first and second flow ducts and said conveyor means, and
    a control flap for selectively communicating one of said first and second flow ducts with the common flow duct.

14. Apparatus according to claim 12, further comprising a bypass duct interconnecting said tubular duct and said blower means, said bypass duct having aperture-control means therein for selectively increasing and decreasing the flow and pressure of the gas current delivered to the conveyor means by the blower means.

15. Apparatus according to claim 11, wherein the blower means has a motor for driving same and the flow and pressure of the gas current delivered by the blower means are adjustable by adjustment of the running speed of said motor.

16. Adjustment according to claim 12, further comprising heating means in at least one of said tubular duct and said supply duct for heating gases present therein.

17. Apparatus according to claim 11, wherein deflectors are provided between the blower means and conveyor means.

18. Apparatus according to claim 17, wherein a substantially horizontal diaphragm is provided between the blower means and the conveyor means.

19. Apparatus according to claim 11, wherein the dimensions of the curved surface correspond approximately to the dimensions of the glass plates.

20. Apparatus according to claim 19, wherein the dimensions of the curved surface are smaller than those of the glass plates to be bent by about 2 to 10 mm.

21. Apparatus according to claim 11, wherein the curved surface is mounted so as to be vertically movable.

22. A process according to claim 1, wherein a plurality of glass plates placed one on another are bent simultaneously.

23. A process according to claim 1, wherein said hot upward gas current, after bending, supports about 80 to 90 percent of the weight of the glass plates.

* * * * *

UNITED STATES PATENT AND TRADEMARK OFFICE
CERTIFICATE OF CORRECTION

PATENT NO. : 4,682,997

DATED : July 28, 1987

INVENTOR(S) : Friedrich Halberschmidt et al.

It is certified that error appears in the above-identified patent and that said Letters Patent is hereby corrected as shown below:

Column 9, line 28, after "adjusting" and before "volume" insert -- the --;

Column 11, line 8, "Adjustment" should be -- Apparatus --.

Signed and Sealed this

Fifteenth Day of December, 1987

Attest:

DONALD J. QUIGG

*Attesting Officer*          *Commissioner of Patents and Trademarks*